US007152236B1

(12) United States Patent
Wugofski et al.

(10) Patent No.: US 7,152,236 B1
(45) Date of Patent: Dec. 19, 2006

(54) INTEGRATION OF INTERNET SOURCES INTO AN ELECTRONIC PROGRAM DATABASE LIST

(75) Inventors: Theodore D. Wugofski, Fort Worth, TX (US); Kim C. Smith, Colleyville, TX (US)

(73) Assignee: Gateway Inc., Irvine, CA (US)

( * ) Notice: Subject to any disclaimer, the term of this patent is extended or adjusted under 35 U.S.C. 154(b) by 441 days.

(21) Appl. No.: 09/002,944

(22) Filed: Jan. 5, 1998

(51) Int. Cl.
*G06F 3/00* (2006.01)
*H04N 7/173* (2006.01)

(52) U.S. Cl. .......................... 725/40; 725/51; 725/52; 725/110; 725/112

(58) Field of Classification Search .............. 348/7, 348/9, 10, 906, 552, 564, 731; 345/327, 345/328; 725/39, 40, 51, 52, 112, 110
See application file for complete search history.

(56) References Cited

U.S. PATENT DOCUMENTS

| 5,027,211 | A | * | 6/1991 | Robertson | 358/183 |
| 5,589,892 | A | * | 12/1996 | Knee et al. | 348/731 |
| 5,774,664 | A | * | 6/1998 | Hidary et al. | 395/200.48 |
| 5,818,935 | A | * | 10/1998 | Maa | 380/20 |
| 5,940,073 | A | * | 8/1999 | Klosterman et al. | 345/327 |
| 5,961,602 | A | * | 10/1999 | Thompson et al. | 709/229 |
| 5,973,683 | A | * | 10/1999 | Cragun et al. | 345/327 |
| 6,002,394 | A | * | 12/1999 | Schein et al. | 345/327 |
| 6,025,837 | A | * | 2/2000 | Matthews, III et al. | 345/327 |
| 6,240,555 | B1 | * | 5/2001 | Shoff et al. | 725/110 |
| 6,247,176 | B1 | * | 6/2001 | Schein et al. | 725/43 |
| 6,469,753 | B1 | * | 10/2002 | Klosterman et al. | 348/552 |

FOREIGN PATENT DOCUMENTS

| WO | WO97/28499 | 8/1997 |
| WO | WO97/31476 | 8/1997 |
| WO | WO97/49237 | 12/1997 |

OTHER PUBLICATIONS

"Personal Television Schedule Service", *IBM Technical disclosure Bulletin*, vol. 39, No. 8, pp. 237-244, (Aug. 1996).
Thrift, P., et al., "JTV- Java-enabled Television", *SPIE*, vol. 3228, pp. 117-122, (Apr. 11, 1997).

* cited by examiner

*Primary Examiner*—Kieu-Oanh Bui
(74) *Attorney, Agent, or Firm*—Ross F. Hunl, Jr.; Stites and Harblson PLLC

(57) ABSTRACT

A computerized system for integrating internet sources and television sources in a convergence system is disclosed. In one embodiment of the invention, the system integrates both television channels and internet channels in a single list of channels available on the system. The lists of channels are stored in an electronic program database. The system solves the problem of managing multiple channels from multiple sources by seamlessly integrating channels from the television with channels from the internet in a single channel list.

20 Claims, 6 Drawing Sheets

300 →

| NUMBER | 01 |
|---|---|
| NAME | NETWORKS |
| CHANNEL-1 | TV-01 |
| CHANNEL-2 | TV-03 |
| CHENNEL-3 | TV-13 |
| -- | VALUE |
| THEME | CHROME |
| LANGUAGE | US ENGLISH |
| PARENTAL LOCKS | NONE |
| CHANNEL ORDER | 1 TO 999 |
| -- | VALUE |

302 →

| NUMBER | 02 |
|---|---|
| NAME | USSB |
| CHANNEL-1 | TV-900 |
| CHANNEL-2 | TV-901 |
| CHENNEL-3 | TV-902 |
| -- | VALUE |
| THEME | JUNGLE |
| LANGUAGE | US ENGLISH |
| PARENTAL LOCKS | PG-13 |
| CHANNEL ORDER | 1 TO 999 |
| -- | VALUE |

304 →

| | | |
|---|---|---|
| | NUMBER | 03 |
| | NAME | JORGE ~306 |
| 308 ~ | CHANNEL-1 | TV-01 |
| 312 ~ | CHANNEL-2 | WEB-01 |
| 310 ~ | CHANNEL-3 | TV-12 |
| | -- | VALUE |
| 314 ~ | THEME | MARBLE |
| 316 ~ | LANGUAGE | SPANISH |
| 318 ~ | PARENTAL LOCKS | PG-13 |
| 320 ~ | CHANNEL ORDER | 999 TO 1 ~322 |
| | -- | VALUE |

FIG. 3

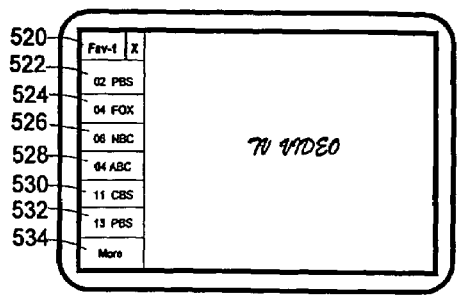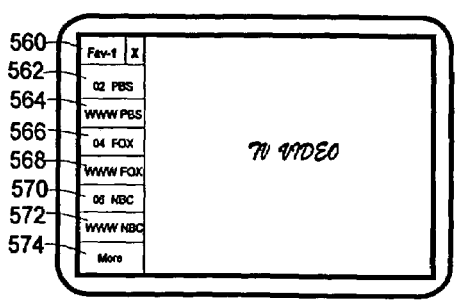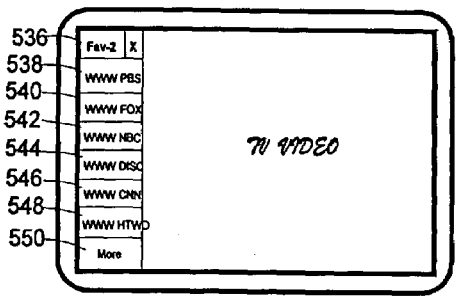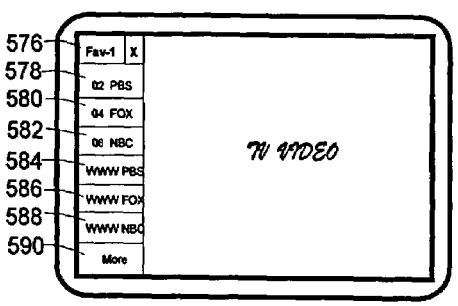
FIG 5A                FIG 5B
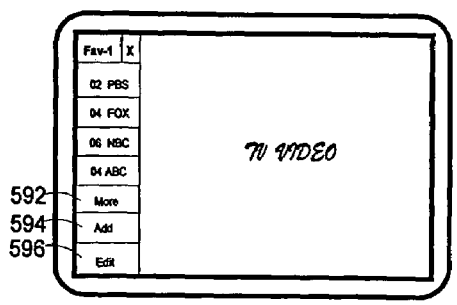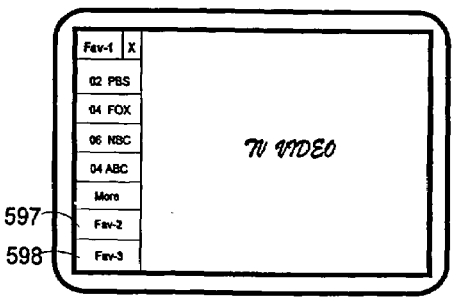
FIG 5C                FIG 5D FIG 6
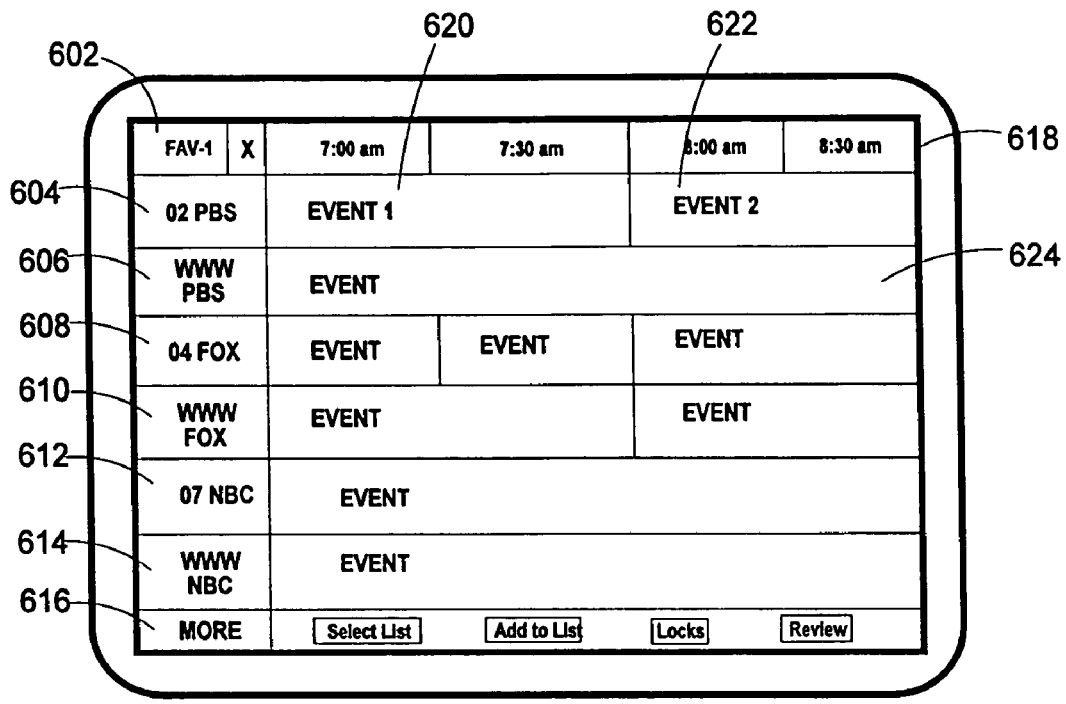
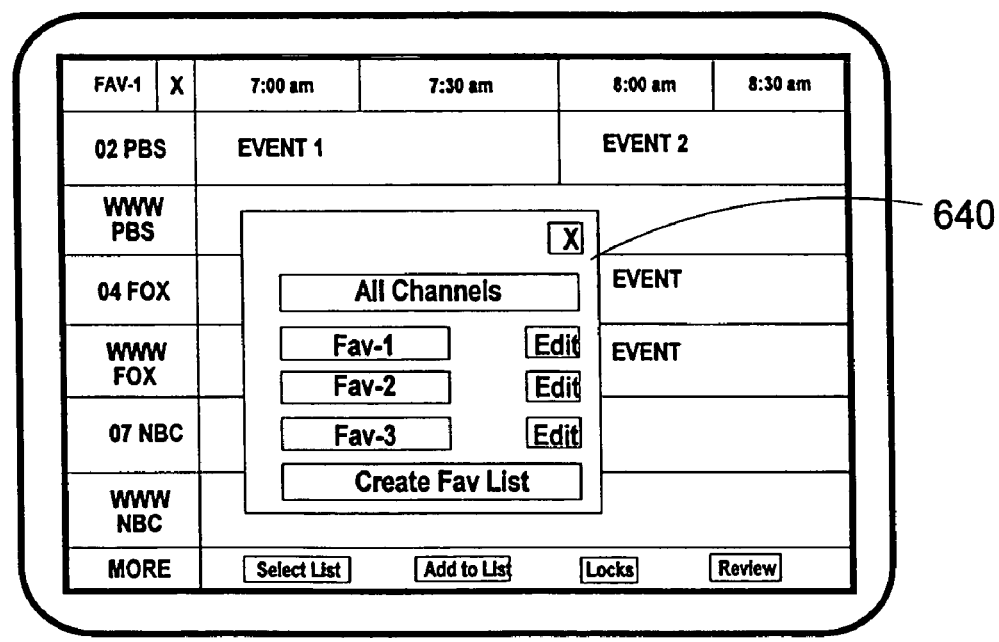

INTEGRATION OF INTERNET SOURCES INTO AN ELECTRONIC PROGRAM DATABASE LIST

RELATED APPLICATIONS

This application is related to the co-assigned and co-filed applications, "Method for managing multiple channel maps from multiple input devices in a multimedia system," "System for time-shifting events in a multi-channel convergence system," "Method and system for associating web sites to television programs," "Individualized parameter control for multiple media sources in a data processing system," "System for scheduled caching of in-band data services," and "System for combining electronic program guide data," all of which are hereby incorporated by reference.

FIELD OF THE INVENTION

The present invention relates generally to convergence systems and more specifically to integrating internet sources into an electronic program database list in such systems.

BACKGROUND OF THE INVENTION

A convergence system refers to a system that includes capabilities that otherwise are provided by separate systems. For example, a Gateway Destination PC/TV system, available from Gateway 2000, Inc., provides for both computer and television capability. Rather than requiring users to have a separate television and a separate computer, convergence systems such as the Destination PC/TV system permit users to utilize both television and computer capability within a single system. Multiple devices are brought together in the single system which typically makes use of one display. For example, at a basic level, users of a convergence system may alternate between a television environment and a computer environment on the same display. The television environment may, for example, include radio-frequency, satellite, cable, or digital television. The computing environment may, in addition to running computer programs, access a wide area network such as the Internet.

The multitude of television channels coupled with the multitude of internet channels accessible in a convergence system can be overwhelming to users. Managing the many channels and events available from the different sources is inconvenient and often difficult for users. The problem with multiple channels and sources in convergence systems is that present systems are unable to include both television channels and internet channels in a single user interface. For example, a PBS station can be available on a TV channel and on a cable channel as well as on a PBS internet web site. However, present systems cannot include these three PBS channels in a single channel list because present systems are unable to include both television channels and internet channels in a single user interface. In order for a convergence system to be truly useful to the user, the convergence system most be able to seamlessly combine channels from the television with channels from the internet in a single environment.

SUMMARY OF THE INVENTION

The above-identified shortcomings as well as other shortcomings are addressed by the present invention, which will be understood by reading and studying the following specification.

The invention describes a convergence system which integrates both television channels and internet channels in a single list of channels available on the system. The list of channels is stored in an electronic program database. By integrating channels from the television with channels from the internet in the single channel list, the system solves the problem of managing multiple channels from multiple sources. Thus, the invention increases the usefulness of the convergence system.

In different embodiments of the invention, computers, computerized systems, and computer-readable media of varying scope are described. Still other and further embodiments, aspects and advantages of the invention will become apparent by reference to the drawings and by reading the following detailed description.

BRIEF DESCRIPTION OF THE DRAWINGS

FIG. 3 is a block diagram of one version of a favorite channel list.

FIG. 5(a) is a block diagram of one version of a favorite channel list graphical user interface displaying a single type of favorite channels from the list in FIG. 3.

FIG. 5(b) is a block diagram of an alternate version of a favorite channel list graphical user interface displaying mixed types of favorite channels from the list in FIG. 3.

FIG. 5(c) is a block diagram of an another version of a favorite channel list graphical user interface for editing a favorite channel list.

FIG. 5(d) is a block diagram of an additional version of a favorite channel list graphical user interface for selecting a different favorite channel list.

FIG. 6 is a block diagram of one version of an electronic program guide for displaying the favorite channel list currently selected.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims. The leading digit(s) of reference numbers appearing in the Figures corresponds to the Figure number.

The embodiments described in the present application can be implemented on a computerized system architecture for an integrated personal computer and television system such as provided by the co-assigned U.S. patent application entitled "Architecture for Convergence Systems" co-filed herewith and which is incorporated herein by this reference. Hardware components for convergence systems are known and available within the art. For example, the Gateway Destination PC/TV system, available from Gateway 2000, Inc., provides a convergence environment across two primary modes of operation: TV viewing, and PC operation (i.e., such that the system provides TV and PC capability).

Figure 1:
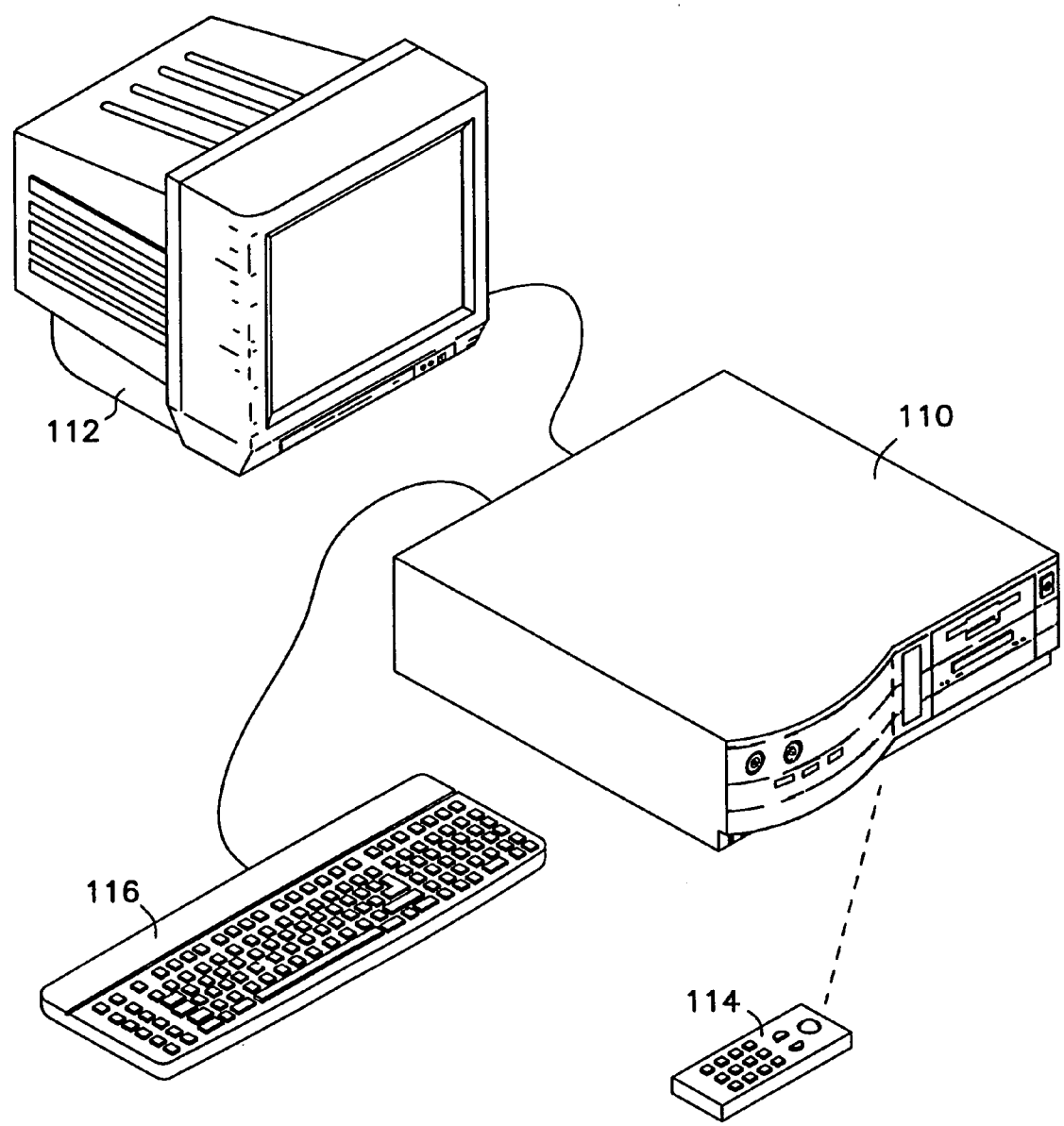
FIG. 1 is a diagram of a typical computer in conjunction with which embodiments of the invention may be implemented.

FIG. 1 is a diagram of a typical computer in conjunction with which embodiments of the invention may be implemented. Computer 110 is operatively coupled to monitor 112, pointing device 114, and keyboard 116. The computerized system provides the hardware component and the software architecture as has been described herein. Computer 110 includes a processor (preferably, an Intel Pentium processor), random-access memory (RAM) (preferably, at least thirty-two megabytes), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 110. Computer 110 preferably is a PC-compatible computer running a version of the Microsoft Windows operating system. The construction and operation of such computers are well known within the art.

Computer 110 includes integrated therein or coupled thereto hardware to provide for what is known as the art as a "convergence environment" such that computer 110 provides capability beyond ordinary PC operation. Such capability preferably including TV capability. For example, the Gateway Destination PC/TV system, available from Gateway 2000, Inc., provides a convergence environment across two primary modes of operation: TV viewing, and PC operation. Computer 110 desirably provides for integration with or includes audio/video (i.e., multimedia) devices including but not limited to: a sound card, a digital video disc (DVD) player, a direct broadcast satellite (DBS) receiver, a TV tuner (for broadcast and/or cable TV), audio/video inputs for external or auxiliary devices, a CD-ROM player, an audio/video tuner having at least radio tuning capability, a cable decoder, a video cassette recorder, a laser disc player, a compact disc player, a DBS integrated receiver-decoder (IRD), and a video camera.

Computer 110 may also be communicatively connected to the Internet in any particular manner, by which the invention is not limited to and which is not shown in FIG. 1. Internet connectivity is well known within the art. In one embodiment, the computer includes a modem and corresponding communication drivers to connect to the Internet via what is known in the art as a "dial-up connection." In another embodiment, the computer includes an Ethernet or similar hardware card to connect to a local-area network (LAN) that itself is connected to the Internet via what is know in the art as a "direct connection" (e.g., T1 line, etc.). In further embodiments, the computer may be connected to the Internet using a cable modem or satellite Internet connectivity.

Monitor 112 permits the display of information, including computer, video and other information, for viewing by a user of the computer. The invention is not limited to any particular monitor 112 or display device. Such monitors include cathode ray tube (CRT) displays, as well as flat panel displays such as liquid crystal displays (LCD's). The monitor is, however, desirably a 31" VGA monitor. Pointing device 114 permits the control of the screen pointer provided by the graphical user interface of operating systems such as versions of Microsoft Windows. The invention is not limited to any particular pointing device 114. Such pointing devices include mouses, touch pads, trackballs, remote controls and point sticks. Finally, keyboard 116 permits entry of textual information into computer 110, as known within the art, and the invention is not limited to any particular type of keyboard. Desirably, keyboard 116 is a wireless keyboard.

Electronic Program Database List

The present invention identifies a computerized system for managing and displaying favorite internet channels together with favorite broadcast channels in an electronic program database list. The electronic program database list can be organized as a user's list of favorite channels or a predefined list of favorite channels. The electronic program database list can also be a program guide list of channels available on the convergence system. Alternate embodiments having different electronic program database lists are contemplated and are within the scope of this invention.

The computerized system ("the system") manages one or more electronic program database lists. The lists are organized by source or type or organized by a mixture of source and type. In other words, the system can store internet channels apart from television channels in separate electronic program database lists or the system can display a mixture of internet channels and television channels together in the same list. The system has graphical user interfaces for selecting a list, adding a list, removing a list, adding channels to a list, removing channels from a list and editing lists.

Integrated Internet and Television Channels

Figure 2A:
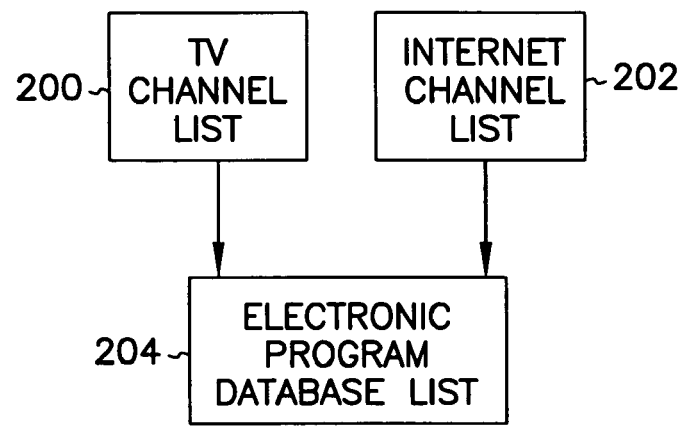
FIGS. 2(a) and 2(b) are block diagrams of a computerized system according to one embodiment of the invention.
Figure 2B:
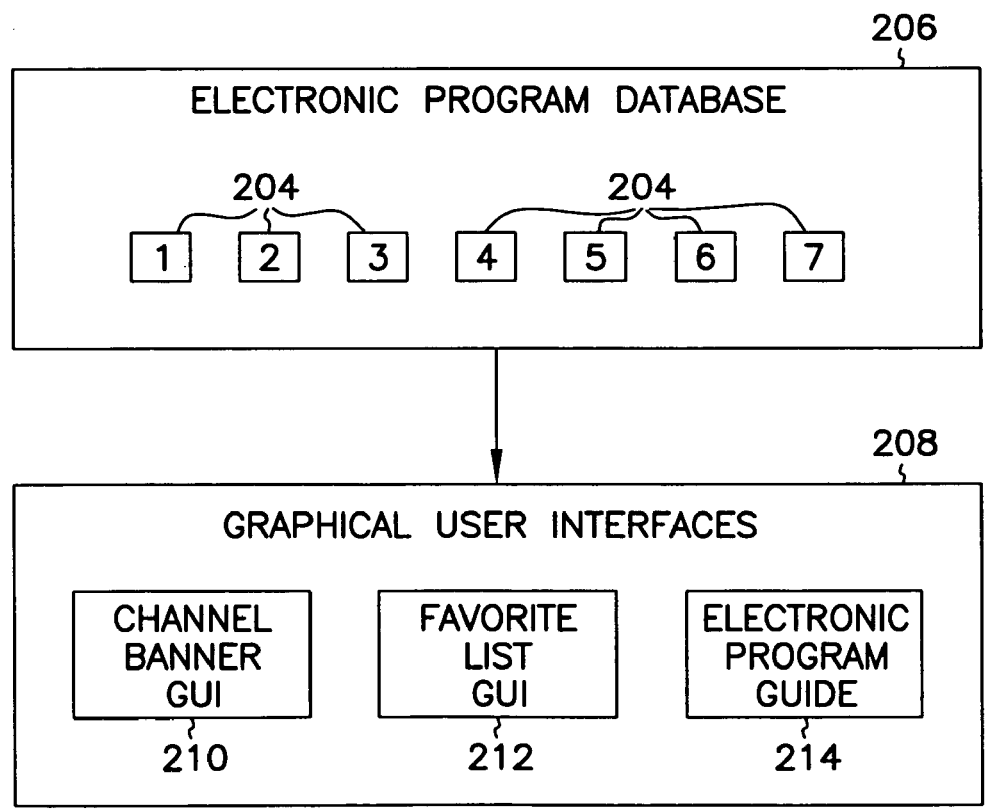

FIGS. 2(a) and 2(b) are block diagrams of a computerized system according to one embodiment of the invention. In FIG. 2(a) a television channel list 200 maintains a database of television channels available to the system. Each one of the television channels is associated with a device that provides the television channel content. The device may be, but is not limited to, NTSC broadcast channels, logical MPEG 2 transport streams for direct broadcast satellite (DBS) and digital television (DTV), cable television channels and Multi-channel, Multi-point Distribution Service (MMDS) channels.

An internet channel list 202 maintains a database of internet channels available to the system. The internet channels are associated with an additional set of devices that provide the internet channel content. The additional devices may include, but are not limited to, internet service providers and logical MPEG transport streams.

An electronic program database list 204 stores a set of channels. Each set of channels is referred to throughout this application as a channel list. The channel list can contain television channels only, internet channels only, or both television channels and internet channels integrated in the same channel list. The channel lists also contain electronic content guide properties such as one or more graphical attributes and one or more behavioral attributes. In one embodiment, list 200 and list 202 are not separate phsyically, but rather are part of database 204.

In one embodiment the channel list is a list of favorite channels, also referred to as a favorite channel list. The favorite channel list may be either a predefined set of channels or a user-defined set of channels. For example, favorite channels organized by theme or usage are provided for in the co-assigned U.S. patent application entitled "System for Managing Favorite Channels" co-filed herewith and which is incorporated herein by this reference.

In FIG. 2(b) an electronic program database 206 maintain a set of channels. A favorite channel list database maintains a set of channel lists. In one embodiment a favorite channel list database is external to the EPG database 206 and identifies a subset of the channels found in the EPG database 206. Note shown in FIG. 2(b) is a favorite services component, that maintains a favorite channel list database.

Graphical User interfaces 208 allow the user to edit the channel lists and the electronic program database. Two graphical user interfaces are a channel banner graphical user interface 210 and a favorites list graphical user interface 212.

Another graphical user interface 208 is an electronic program guide (EPG) 214 displaying the currently selected channel list and the events and content available on those channels. The EPG display provides a program grid having a plurality of sources available along one axis and a plurality of events and a corresponding time along another axis. The sources available include internet sources as well as broadcast sources.

The electronic program guide also provides one or more management functions for managing the channel lists. For example, these functions display secondary menus for selecting a channel list, adding a channel list or editing a channel list. Alternate embodiments having different graphical user interfaces are contemplated and within the scope of the invention.

Graphical attributes and behavioral attributes of the electronic program guide change when the currently selected channel list changes. The graphical and behavioral attributes stored in the channel list determine a particular graphical user interface for the channel list when displayed in the electronic program guide. The graphical user interface may include graphical attributes such as the color of buttons, backgrounds and text. The graphical user interface may also include behavioral attributes such as the ordering of channels when the list of channels is displayed. For example, when a particular favorite channel list is selected, the channel ordering and parental rating locks may change based on the stored graphical and behavioral attributes.

FIG. 3 is a block diagram of one version of a favorite channel list integrating television channels and internet channels as well as storing electronic content guide properties. The version in FIG. 3 is a favorite channel list database storing favorite channel lists. Three favorite channel lists 300, 302, 304 are represented in FIG. 3. Favorite list number 03 304 is identified by the name Jorge 306 and includes a mixture of both television channels and internet channels. For example, channel-1 308 and channel-3 310 are television channels while channel-2 312 is an internet channel. The electronic content guide properties contained in favorite channel list 03 304 include theme 314, language 316, parental locks 318, and channel order 320. For example, the channel order behavioral attribute is "999 to 1" 322. This behavioral attribute means when favorite list number 03 304 is displayed, the channels will be displayed in reverse order from the highest channel number to the lowest channel number.

Channel Banner Graphical User Interface

Figure 4A:
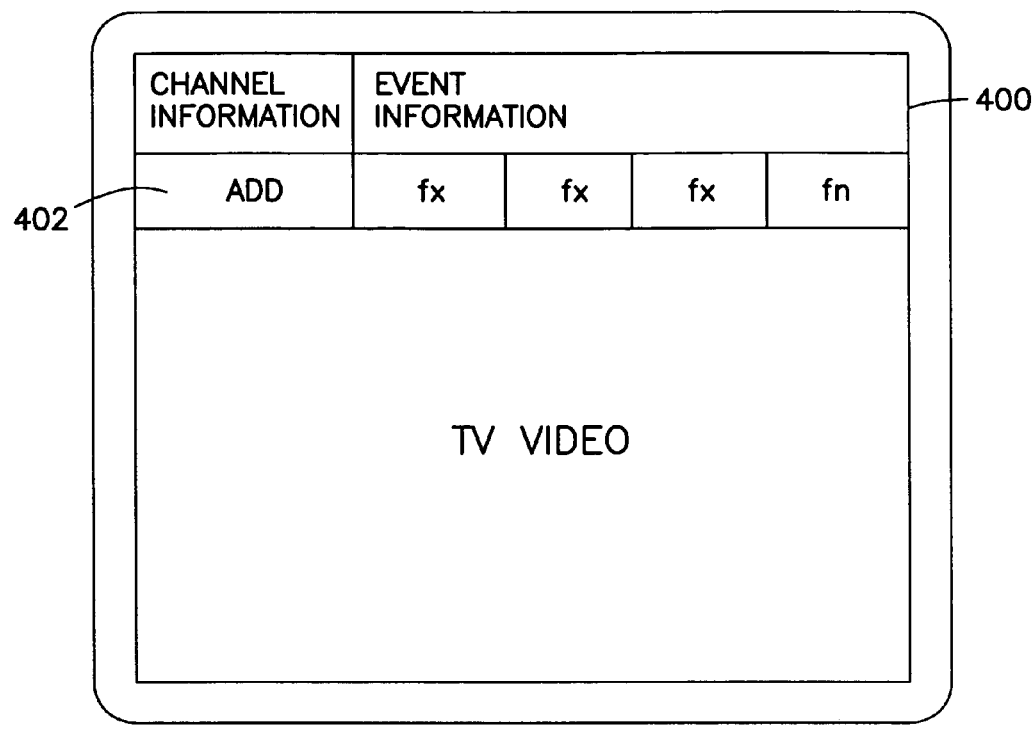
FIG. 4(a) is a block diagram of one version of a channel banner graphical user interface for managing the list in FIG. 3.

FIG. 4(a) is a block diagram of one version of the channel banner for managing the favorite channel list database in FIG. 3. The channel banner 400 provides a control 402 for adding the current channel to the currently selected favorite list. The channel banner also provides a control for removing the current channel from the currently selected favorite list.

Figure 4B:
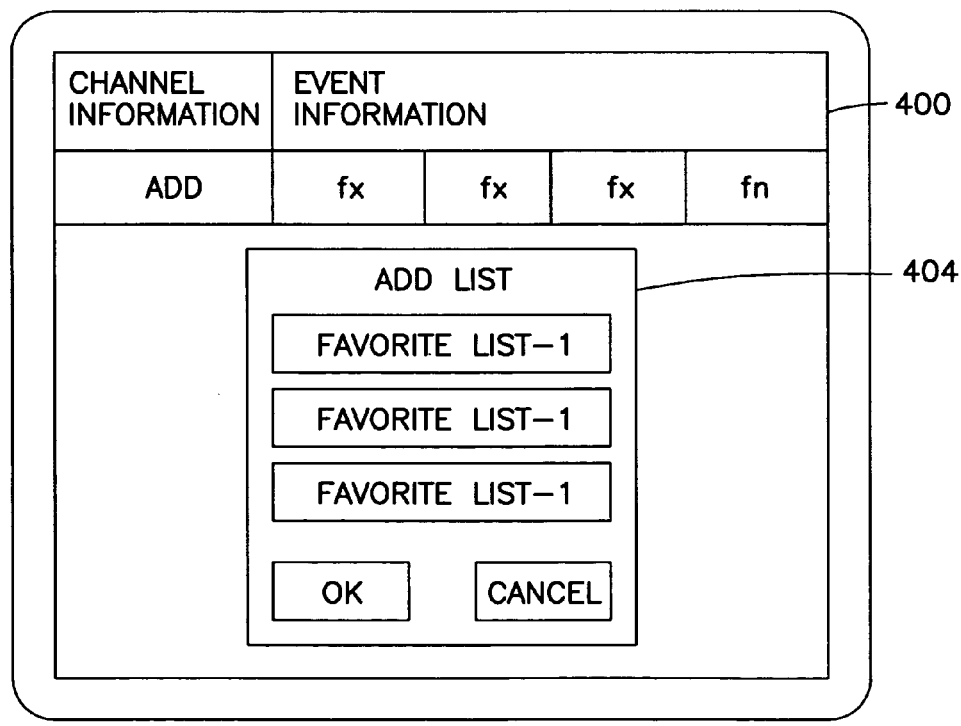
FIG. 4(b) is a block diagram of an alternate version of a channel banner graphical user interface for managing the list in FIG. 3.

FIG. 4(b) is a block diagram of an alternate version of the channel banner for managing the favorite channel database in FIG. 3. For systems having multiple favorite channel lists or not supporting a current favorite list, the channel banner 400 displays a secondary menu 404 for selecting the desired favorite list to which the current channel is to be added or removed.

Favorite Channel List Graphical User Interface

The favorite channel list graphical user interface displays either a single type of favorite channels or a mix of types of favorite channels. FIG. 5(a) is a block diagram of one version of a favorite channel graphical user interface ("favorite channel list GUI") for managing the favorite channel list database in FIG. 3. The favorite channel list GUI of FIG. 5(a) displays a single type of favorite channels from the favorite channel list database in FIG. 3. Favorite channel list Fav-1 520 displays only favorite television channels. For example, favorite channel list Fav-1 520 includes the television channels PBS 522, FOX 524, NBC 526, ABC 528, CBS 530 and a second channel PBS 532. Favorite channel list Fav-2 536 displays only favorite internet channels. For example, favorite channel list Fav-2 536 includes the internet channels for PBS 538, FOX 540, NBC 542, the Discovery channel (DISC) 544, CNN 546 and Hotwired (HTWD) 548. Both favorite channel list Fav-1 520 and Fav-2 536 display a More control 534, 550 indicating that additional channels are available in each list. Thus, the favorite channel lists in FIG. 5(a) display only a single type of favorite channels, that is only television channels or only internet channels, in each favorite channel list.

FIG. 5(b) is a block diagram of an alternate version of a favorite channel list GUI displaying mixed types of favorite channels from the favorite channel list database in FIG. 3. The favorite channel list GUI of FIG. 5(b) displays both television channels and internet channels in the same favorite channel list. Favorite channel list Fav-1 560 displays the integrated channels in the same favorite channel list. For example, favorite channel list Fav-1 560 includes the a PBS television channel 562 followed by a PBS internet channel 564, a FOX television channel 566 followed by a FOX internet channel 568, and a NBC television channel 570 followed by a NBC internet channel 572. Alternatively, favorite channel list Fav-2 576 in FIG. 5(b) displays the integrated channels with the television channels appearing first followed by the internet channels. For example, favorite channel list Fav-2 576 first displays the television channels for PBS 578, FOX 580, and NBC 582 then displays the internet channels for PBS 584, FOX 586, and NBC 588. Both favorite channel lists in FIG. 5(b), Fav-1 560 and Fav-2 576, display a More control 574, 590 indicating that additional channels are available in each list. Thus, the favorite channel lists in FIG. 5(b) display both television channels and internet channels integrated in a single favorite channel list.

FIG. 5(c) is a block diagram of an another version of a favorite channel list GUI. The favorite channel list GUI provides functions for editing a favorite channel list from the favorite channel list database in FIG. 3. In addition to the More control 592, the favorite channel list GUI in FIG. 5(c) includes an Add control 594 and an Edit control 596. The Add control 594 allows the user to add a television channel or an internet channel to the currently selected favorite channel list. The Edit control 596 allows the user to edit the currently selected favorite channel list. For example, the user can edit the graphical or behavioral attributes of the currently selected favorite channel list using the Edit control 596. Thus, the favorite channel list GUI includes additional controls for adding the current channel to the favorite channel list and editing the favorite channel list. Alternate embodiments providing additional controls, such as a control for removing the current channel from the favorite channel list, are also contemplated and are within the scope of this invention.

FIG. 5(*d*) is a block diagram of an additional version of a favorite channel list GUI. The favorite channel list GUI provides functions for selecting a different favorite channel list from the favorite channel database in FIG. 3. The favorite channel list GUI in FIG. 5(*d*) includes Fav-2 list access 597 and Fav-3 list access 598 allowing the user to edit additional lists. Thus, the favorite channel list GUI in FIG. 5(*d*) allows the user to select other favorite channel lists.

Electronic Program Guide with Integrated Channels

FIG. 6 is a block diagram of one version of an electronic program guide (EPG) for displaying the channel list currently selected and events or content available on each channel. The EPG displays information in the form of a program grid. The program grid displays a plurality of sources available along one axis and a plurality of events and a corresponding time for each one of the events along another axis. The sources available include internet sources as well as television sources. For example, in FIG. 6 the identifier for currently displayed favorites list is located in the top left corner. In this case the identifier is Fav-1 602.

The sources available in list Fav-1 602 are listed vertically along the left edge of the EPG display. For example, the sources available in the list Fav-1 602 include a PBS television channel 604, a PBS internet channel 606, a FOX television channel 608, a FOX internet channel 610, a NBC television channel 612 and a NBC internet channel 614. At the bottom of the list of sources is the control More 616 to view additional channels in the favorite channel list Fav-1 602.

In FIG. 6 the events on each channel are listed horizontally following each channel identifier. The corresponding time for each one of the events is listed horizontally along the top of the EPG in a time bar 618. The time bar 618 is shown in thirty minute increments. For example, the television channel PBS 604 has two one-hour events. Event1 620 begins at 7:00 AM and Event2 622 begins at 8:00 AM. The internet channel PBS 606 has a single event 624. Internet channel event field is left open if the content of the internet channel does not have scheduled events. It is contemplated and within the scope of the invention that as internet channels such as internet web sites host more scheduled activities the event field will describe the content of the scheduled activity. For instance, the event field may describe a chat session at a particular time and on a particular topic. One manner of determining the content of internet channel is to use the information in the internet web page header.

In FIG. 6 the EPG also provides functions for managing favorite lists. These functions are displayed in a secondary menu 640. The secondary menu 640 provides functions for selecting a favorite list, creating a favorite list or editing a favorite list.

The currently selected favorite channel list may change the graphical or behavioral attributes of the EPG in FIG. 6. For example, when different favorite channel list is selected, the channel ordering and parental rating locks may change based on properties stored in the selected favorite channel list.

Other mechanisms for integrating television channels and internet channels in an electronic program database list will be apparent to those skilled in the art. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An information handling system, comprising:
a graphical user interface;
wherein the graphical user interface is configured to display a channel list including at least one television channel and at least one scheduled internet channel concurrently, and is further configured to provide at least one management function selected from a group consisting of: adding the television channel, adding the internet channel, removing the television channel, and removing the internet channel, wherein the at least one scheduled internet channel has at least one event with a scheduled start time and a scheduled end time, and wherein the graphical user interface is further configured to display the scheduled start time and the scheduled end time.

2. The information handling system of claim 1, wherein the channel list is a favorite channels list.

3. The information handling system of claim 1, wherein the graphical user interface includes an electronic program guide configured to display the channel list.

4. The information handling system of claim 1, further comprising an electronic program database for storing the channel list.

5. The information handling system of claim 1, further comprising a convergence system which includes the information handling system.

6. A computerized system for integrating internet sources into an electronic program database comprising:
one or more television channels;
one or more scheduled internet channels having at least one event with a scheduled start time and a scheduled end time;
one or more channel lists integrating the television channels and the internet channels;
a means for storing each one of the channel lists; and
one or more user interfaces providing at least one management function selected from a group consisting of: adding the television channel, adding the internet channel, removing the television channel, and removing the internet channel, and wherein the scheduled start time and the scheduled end time are displayed in the one or more user interfaces.

7. The computerized system of claim 6, further comprising a means for displaying a selected one of the channel lists wherein each one of the channel lists contains one or more stored properties for the means for displaying.

8. The computerized system of claim 7, wherein at least one of the stored properties relates to a graphical attribute of the means for displaying.

9. The computerized system of claim 7, wherein at least one of the stored properties relates to a behavioral attribute of the means for displaying.

10. The computerized system of claim 6, wherein the user interfaces provide a management function of selecting the channel list.

11. The computerized system of claim 6, wherein the graphical user interface is a channel banner graphical user interface.

12. The computerized system of claim 6, wherein the graphical user interface is a favorite channel list graphical user interface.

13. A computer-readable medium having computer-executable components comprising:
 a database component for storing one or more channel lists, at least one of the channel lists integrating one or more television channels and one or more scheduled internet channels, wherein the one or more scheduled internet channels has at least one event with a scheduled start time and a scheduled end time; and
 a user interface component for displaying the channel lists and providing at least one management function selected from a group consisting of: adding the television channel, adding the internet channel, removing the television channel, and removing the internet channel, and wherein the user interface component is further for displaying the scheduled start time and the scheduled end time.

14. The computer of claim 13, wherein the computer-readable medium comprises a memory.

15. A computer comprising:
 a processor;
 a computer-readable medium;
 a display device; and
 at least one application program, each application program executed by the processor from the computer readable medium to provide one or more channel lists for viewing on the display device wherein the channel lists integrate one or more television channels and one or more scheduled internet channels, and further to provide a graphical user interface for providing at least one management function selected from a group consisting of: adding the television channel, adding the internet channel, removing the television channel, and removing the internet channel, wherein the one or more scheduled internet channels have at least one event with a scheduled start time and a scheduled end time, and wherein the at least one application program is further to display the scheduled start time and the scheduled end time.

16. The computer of claim 15, wherein the computer-readable medium comprises a memory.

17. A method of integrating sources in a convergence system, the method comprising the steps of:
 including at least one television channel having an event with a scheduled start time and a scheduled end time and at least one scheduled internet channel concurrently in a channel list, wherein the at least one scheduled internet channel has at least one different event with a scheduled start time and a scheduled end time;
 storing the channel list in a database;
 displaying on a display device the channel list; and
 displaying a graphical user interface on the display device wherein the graphical user interface is configured to provide at least one management function selected from a group consisting of: adding the television channel, adding the internet channel, removing the television channel, and removing the internet channel, and wherein the scheduled start time and the scheduled end time are displayed in the graphical user interface.

18. An information handling system, comprising:
 a graphical user interface;
 wherein the graphical user interface is configured to display a channel list including at least one television channel and at least one scheduled internet channel concurrently, wherein the channel list includes graphical and behavioral attributes to determine the graphical user interface for the channel list when displayed in an electronic program guide, and is further configured to provide at least one management function selected from a group consisting of: adding the television channel, adding the internet channel, removing the television channel, and removing the internet channel, wherein the at least one scheduled internet channel has at least one event with a scheduled start time and a scheduled end time, and wherein the graphical user interface is further configured to display the scheduled start time and the scheduled end time.

19. A method of integrating sources in a convergence system, the method comprising the steps of:
 including at least one television channel and at least one internet channel concurrently in a channel list, wherein both the at least one television channel and the at least one internet channel each have at least one different event with a scheduled start time and a scheduled end time;
 storing the channel list in a database;
 displaying on a display device the channel list while graphically showing the events for both the at least one internet channel and the at least one television channel with scheduled start times and scheduled end times; and
 displaying a secondary graphical user interface on the display device wherein the graphical user interface is configured to provide at least one management function selected from a group consisting of: adding a television channel, adding an internet channel, removing a television channel, and removing an internet channel.

20. A computer comprising:
 a processor;
 a computer-readable medium;
 a display device;
 means for including at least one television channel and at least one internet channel concurrently in a channel list, wherein both the at least one television channel and the at least one internet channel have at least one event with a scheduled start time and a scheduled end time;
 means for storing the channel list in a database;
 means for displaying on a display device the channel list while graphically showing the events for both the at least one internet channel and the at least one television channel with scheduled start times and scheduled end times; and
 means for displaying a secondary graphical user interface on the display device wherein the graphical user interface is configured to provide at least one management function selected from a group consisting of: adding a television channel, adding an internet channel, removing a television channel, and removing an internet channel.

\* \* \* \* \*